United States Patent [19]
Bruning

[11] Patent Number: 5,909,281
[45] Date of Patent: Jun. 1, 1999

[54] INTERFEROMETRIC MEASUREMENT OF SURFACES WITH DIFFRACTIVE OPTICS AND PLANAR WAVEFRONT IMAGING

[75] Inventor: John H. Bruning, Pittsford, N.Y.

[73] Assignee: Tropel Corporation, Fairport, N.Y.

[21] Appl. No.: 08/885,419

[22] Filed: Jun. 30, 1997

Related U.S. Application Data

[63] Continuation of application No. 08/483,737, Jun. 7, 1995, Pat. No. 5,654,798, which is a continuation-in-part of application No. 08/375,499, Jan. 19, 1995, abandoned.

[51] Int. Cl.$^6$ .................................................. G01B 9/02
[52] U.S. Cl. .......................... 356/354; 356/359; 356/360
[58] Field of Search ................................... 356/354, 359, 356/360

[56] References Cited

U.S. PATENT DOCUMENTS

| | | |
|---|---|---|
| 3,907,438 | 9/1975 | Holeman . |
| 4,391,526 | 7/1983 | McLaughlin . |
| 4,436,424 | 3/1984 | Bunkenburg . |
| 4,606,640 | 8/1986 | Hirst . |
| 4,653,922 | 3/1987 | Jarisch et al. . |
| 4,678,333 | 7/1987 | Anderson . |
| 4,791,584 | 12/1988 | Greivenkamp, Jr. . |
| 4,898,470 | 2/1990 | Cleaveland . |
| 5,041,726 | 8/1991 | Chang et al. . |
| 5,210,591 | 5/1993 | DeGroot . |
| 5,220,403 | 6/1993 | Batchelder et al. . |
| 5,249,032 | 9/1993 | Matsui et al. . |
| 5,268,742 | 12/1993 | Magner . |

FOREIGN PATENT DOCUMENTS

| | | |
|---|---|---|
| 0179935 | 5/1986 | European Pat. Off. . |
| 215388 | 11/1984 | Germany . |
| 233644 | 3/1986 | Germany . |
| 106769 | 7/1994 | Germany . |
| 62-177421 | 4/1987 | Japan . |
| 4221704 | 12/1992 | Japan . |
| 4286904 | 12/1992 | Japan . |

OTHER PUBLICATIONS

"Zone Plate Interferometer" by Raymond N. Smart, May 1974, vol. 13, No. 5, Applied Optics, pp. 1093–1099.
"Improved Oblique—Incidence Interferometer" by P. Hariharan, Optical Engineering, vol. 14, No. 3, May–Jun. 1975, pp. 257–258.
"Holographic Interferometer to Test Optical Surfaces" by Fernando Broder–Bursztyn and Daniel Malacara–Hernandez, Applied Optics, vol. 14, No. 9, Sep. 1975, pp. 2280–2282.
"Interferometric Surface Mapping with Variable Sensitivity" by W. Jaerisch and G. Makosch, Applied Optics, vol. 17, No. 5, Mar. 1, 1978, pp. 740–743.
"Interferometric Construction of Circular Gratings" by E. Leith, H. Chen, G. Collins, K. Scholten, G. Swanson, and J. Upatnieks, Applied Optics, vol. 19, No. 21, Nov. 1, 1980, pp. 3626–3630.
"Optical Figure Characterization for Cylindrical Mirrors and Lenses" by Alvin D. Schnurr and Allen Mann, Optical Engineering, vol. 20, No. 3, May/Jun. 1981, pp. 412–416.

(List continued on next page.)

*Primary Examiner*—Robert Kim
*Assistant Examiner*—Amanda Merlino
*Attorney, Agent, or Firm*—Eugene Stephens & Associates

[57] ABSTRACT

An interferometer (10) employs diffractive optics (30 and 40) for measuring errors in test surfaces (14) that differ from planes and spheres. A beam of light (28) having a planar shape is separated into two portions (32 and 34). One of the diffractive optics (30) can be used to reshape the second portion (34) of a beam of light (28) into a non-planar shape along a path of grazing incidence to the test surface (14), and the other diffractive optic (40) can be used to further reshape the second portion (34) back into a planar shape in common with the first portion (32) of the beam of light (28). The two planar beam portions (32 and 34) are recombined to produce an interference pattern (44) representing the errors in the test surface (14).

19 Claims, 5 Drawing Sheets

OTHER PUBLICATIONS

"Cylindrical Lenses: Testing and Radius of Curvature Measurement" by R. Diaz–Uribe, J. Pedraza–Contreras, O. Cardona–Nunez, A. Cordero–Davila, and A. Cornejo Rodriquez, Applied Optics, vol. 25, No. 10, May 15, 1986, pp. 1707–1709.

"Testing Cylindrical Lenses" by Joseph M. Geary, Optical Engineering, vol. 26, No. 12, Dec. 1987, pp. 1219–1224.

"Data Analysis in Fiber Optic Testing of Cylindrical Optics" by Joseph M. Geary, Optical Engineering, Mar. 1989, vol. 28, No. 3, pp. 212–216.

"Interferometry on Wolter X–ray Optics: A Possible Approach" by Joseph M. Geary, Optical Engineering, vol. 28, No. 3, Mar. 1989, pp. 217–221.

"Constant Radial Shearing Interferometry with Circular Gratings" by Qing–Shin Ru, Nagaaki Ohyama, Toshio Honda, and Jumpei Tsujiuchi, Applied Optics, vol. 28, No. 15, Aug. 15, 1989, pp. 3350–3353.

"Profile Measurement of an Aspheric Cylindrical Surface from Retroreflection" by Ding–tin Lin and Der–Shen Wan, Applied Optics, vol. 30, No. 22, Aug. 1, 1991, pp. 3200–3204.

"Profile Measurements of Cylindrical Surfaces" by Der–Shen Wan and Ding–tin Lin, Applied Optics, vol. 32, No. 7, Mar. 1, 1993, pp. 1060–1064.

"Determination of Two–Dimensional Planar Displacement by Moire Fringes of Concentric–Circle Gratings" by Yoon–Chang Park and Seung–Woo Kim, Applied Optics, vol. 33, No. 22, Aug. 1, 1994, pp. 5171–5176.

"Set of Orthonormal Surface Error Descriptors for Near–Cylindrical Optics" by Paul Glenn, Optical Engineering, vol. 23 No. 4, Jul./Aug. 1984, pp. 384–390.

"Grazing Incidence Interferometry Applied to the Measurement of Cylindrical Surfaces" by Thomas Dresel, Johannes Schwider Alexandedr Wehrahahn. & Sergey Babin, Optical Engineering, vol. 34, No. 12, Dec. 1995.

"Grating Interferometer for Flatness Testing" by Peter J. deGroot Optics Letters, vol. 21, No. 3, Feb. 1, 1996, pp. 3531–3535.

INTERFEROMETRIC MEASUREMENT OF SURFACES WITH DIFFRACTIVE OPTICS AND PLANAR WAVEFRONT IMAGING

RELATED APPLICATIONS

This application is a Continuation of allowed parent application Ser. No. 08/483,737, filed Jun. 7, 1995, now U.S. Pat. No. 5,654,798, entitled INTERFEROMETRIC MEASUREMENT OF SURFACES WITH DIFFRACTIVE OPTICS AT GRAZING INCIDENCE, which parent application is a Continuation-In-Part of grandparent Application Ser. No. 08/375,499, filed Jan. 19, 1995, entitled INTERFEROMETRIC MEASUREMENT OF SURFACES WITH DIFFRACTIVE OPTICS AT GRAZING INCIDENCE, abandoned. The parent and grandparent applications are hereby incorporated by reference.

TECHNICAL FIELD

The invention relates to the fields of metrology and optics and, in particular, to the use of interferometry for measuring surface contours at grazing incidence, which I define as an off-normal angle of incidence sufficient to produce specular reflection.

BACKGROUND

Interferometers are often preferred over probe-based coordinate measuring machines for measuring test surfaces because the interferometers measure the entire test surfaces at once whereas the coordinate measuring machines measure the test surfaces one point at a time. Movements of the coordinate measuring machines between the different measuring points detract from the accuracy of the measures and require a more controlled operating environment to minimize changes in the test surface during the extended period of measurement.

Interferometers produce images of surfaces in the form of interference patterns that represent contour maps of surface variations. The interference pattern is created by combining a test wavefront (or beam) reflected from the test surface with a reference wavefront (or beam) representing a theoretical reflection from the surface. The two wavefronts are shaped by reflective or refractive optics. Highly reflective surfaces are usually measured by arranging the test wavefront to strike the test surface at normal incidence. Surfaces having lower reflectance are measured at grazing incidence.

However, interferometers are seldom used to measure surfaces other than planes or spheres because matching wavefronts are difficult to produce. Anamorphic optical elements can be used to produce the matching wavefronts; but these elements are expensive, difficult to make and test, and limited in accuracy. More conventional optics can also be used to construct the matching wavefronts by combining smaller portions of spherical or nearly spherical wavefronts. However, combining multiple measurements of conventional optics is time consuming and may require instrument motions that also detract from accuracy.

A less well-known and little developed interferometric approach to measuring both planar and cylindrical surfaces involves the use of diffractive optics for relatively shaping test and reference wavefronts. For example, a 1973 paper entitled "Oblique Incidence Interferometry Applied to Non-Optical Surfaces" by K. G. Birch, Journal of Physics E: Scientific Instruments, Volume 6, reports on the use of a pair of identical diffraction gratings for measuring planar surfaces at grazing incidence. The first diffraction grating divides test and reference wavefronts into different diffraction orders. The test wavefront is reflected from a planar test surface and is recombined with the reference wavefront at the second diffraction grating.

East German Patent 106769 issued to Johannes Schwider in 1974 proposes use of two identical gratings for measuring cylindrical surfaces at grazing incidence. The first diffraction grating divides a planar primary wavefront into test and reference wavefronts. The test wavefront is diffracted into an axiconic wavefront that is reflected from a cylindrical test surface at grazing incidence. The reference wavefront is transmitted without change. The second diffraction grating recombines the two wavefronts by transmitting the test wavefront without further change and by diffracting the reference wavefront into the axiconic shape of the test wavefront.

Little practical exploitation of these ideas has been achieved over the last 20 years. Many other alternatives are available for measuring planar surfaces; and further developments are required to provide accurate measurements over a wider range of surface geometries, especially test surfaces that further affect the shape of the test wavefront. Practical considerations relating to alternative setups for particular test pieces, efficiency of light conveyance, and control over image contrast remain unresolved.

SUMMARY OF INVENTION

My invention overcomes the limitations of conventional interferometric systems for measuring test surfaces that differ from planes and spheres by further developing the use of diffractive optics for relatively shaping test and reference wavefronts. Obstacles to the use of diffractive optics are overcome, and specific designs are provided to appropriately shape the test wavefronts to match three-dimensional test surfaces at predetermined grazing angles.

One version of my invention as a single-pass interferometer includes a light source for producing a primary wavefront having a planar shape. A leading diffractive optic (a) divides the primary wavefront into test and reference wavefronts and (b) reshapes the test wavefront into a non-planar shape different than the reference wavefront for reflecting from a three-dimensional test surface at a predetermined grazing angle, which I define as an off-normal angle inclined to the test surface within a range of specular reflection. A following diffractive optic (a) recombines the test and reference wavefronts and (b) further reshapes the test wavefront into a planar shape in common with the reference wavefront for producing a pattern of interference indicative of variations in the test surface. An image-forming optic images the interference pattern between the further reshaped test wavefront and the reference wavefront onto an image-recording device.

The leading and following diffractive optics can differ from one another to accommodate test surfaces that further affect the shape of the test wavefront. Any deviations of the reflected test wavefront from a theoretical wavefront that is generated and encoded by the diffracting pattern of the diffractive optics are apparent in the resulting interference pattern with the reference wavefront.

The two diffractive optics are preferably aligned with a common reference axis, which corresponds to a reference point of the interference pattern. Angles about the common reference axis at points of reflection from the test surface correspond to angles about the reference point of the interference pattern. However, axial distances along the common reference axis at the points of reflection from the test surface relate to radial distances from the reference point of the interference pattern. Deviations in the test surface height at the points of reflection are measurable at the corresponding angular and radial positions in the interference pattern as phase differences between the test and reference wavefronts.

The diffractive optics can be amplitude or phase modulated with diffracting patterns formed by "grooves" or other discontinuities having nonlinear paths that are shaped to correspond with transverse sections of the test surface along the reference axis. Spacing between the grooves, also referred to as "pitch", can be varied to control angles of diffraction. Blazing or other known techniques can be used to match intensities of the test and reference wavefronts to maximize contrast of the interference pattern. One of the diffractive optics can be moved relative to the test piece to provide phase shifting for more accurately interpreting the interference pattern. Also, an alternative setup can be obtained with the same diffractive optics by positioning the following diffractive optic after a crossover point of focus produced by an internal reflection from the test piece.

DRAWINGS

DETAILED DESCRIPTION

Figure 1:
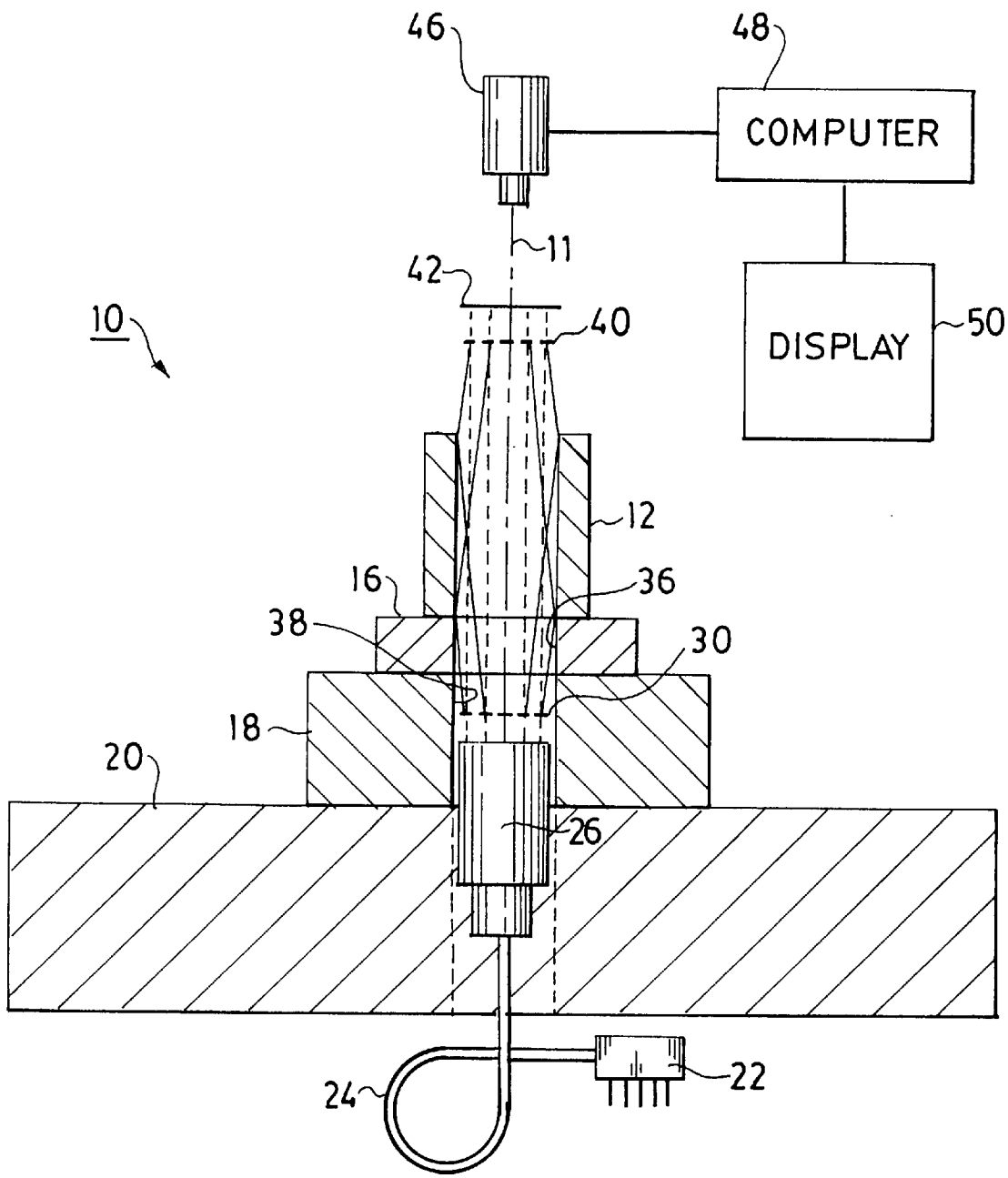
FIG. 1 is a schematic diagram of my new interferometer set up for single-pass measurement with two diffractive optics.
Figure 2:
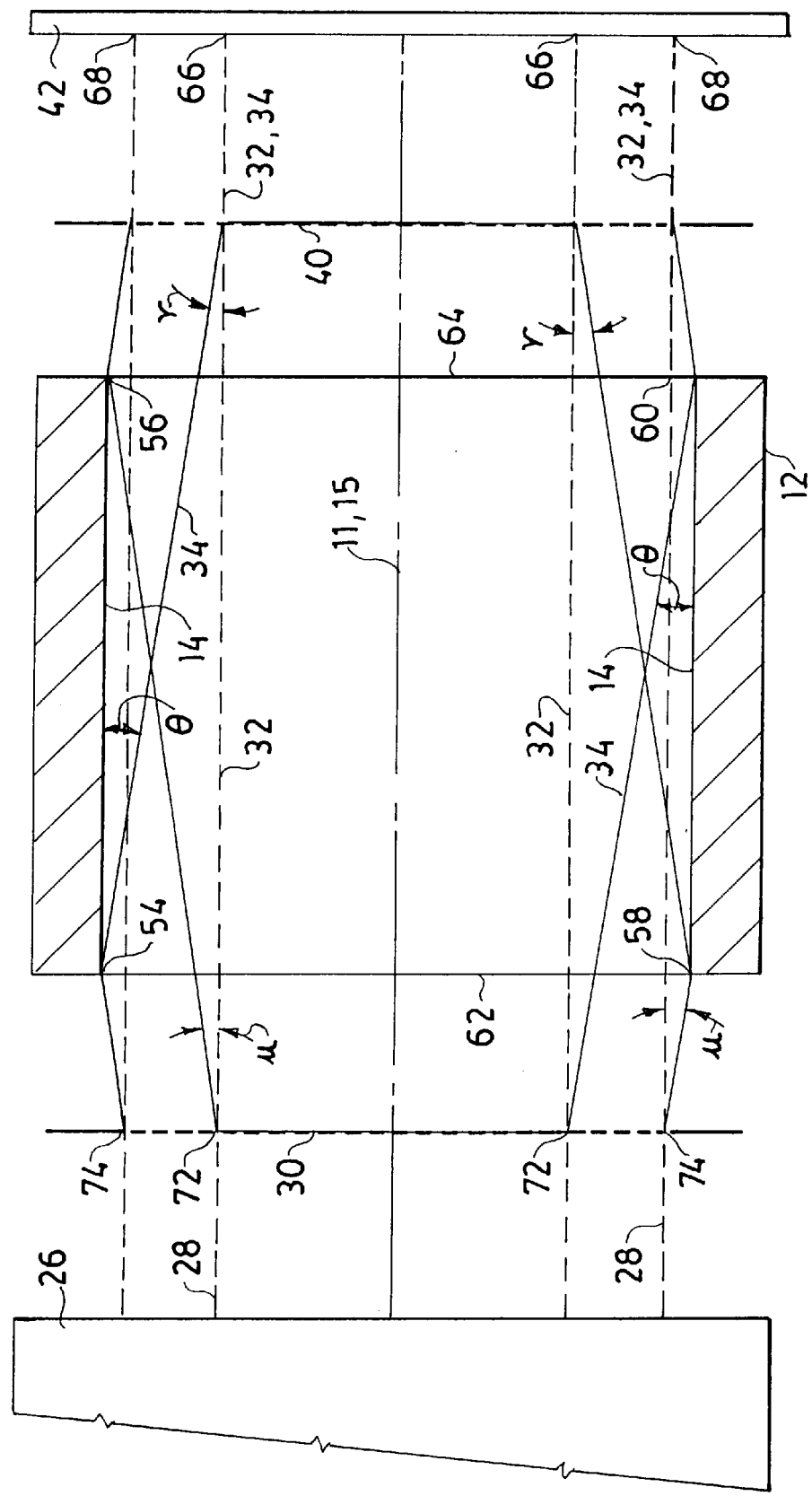
FIG. 2 is a diagram of the diffractive optics used in the interferometer for measuring internal cylindrical test surfaces.

My invention is illustrated in FIG. 1 as a single-pass interferometer 10, incorporating features of a conventional Mach-Zender interferometer. A test piece 12, shown also in FIG. 2, has an inside cylindrical surface 14 under test with an axis of symmetry 15 that is aligned with a reference axis 11 of the interferometer 10. The test piece 12 is mounted on an air bearing 16 carried by a surface plate 18 on a base 20. The air bearing 16 provides both rotational and translational control over the test piece 12 to permit multiple measures from different positions. Mathematical comparisons between the multiple measures can be used to separate systematic errors.

A light source 22, such as a laser diode or a HeNe laser, produces a beam of coherent light. An optical fiber 24 transmits the beam through the base 20 to a collimator 26 that shapes the beam into a planar primary wavefront 28 represented by selected rays. A leading diffractive optic 30, such as a circular transmissive diffraction grating or binary optic, divides the planar wavefront 28 into a reference wavefront 32 and a test wavefront 34. The reference wavefront 32 remains a planar wavefront. However, the test wavefront 34 is reshaped by the leading diffractive optic 30 into an axiconic wavefront composed of rays that are uniformly inclined to the reference axis 11 through a first diffraction angle "$\mu$", which is measured within axial planes of the reference axis 11.

Respective openings 36 and 38 through the air bearing 16 and the surface plate 18 provide clearance enabling the reference and test wavefronts 32 and 34 to propagate along the reference axis 11 through a hollow center of the test piece 12. The test wavefront 34 reflects from different positions of the cylindrical test surface 14 at a constant grazing angle "$\theta$". A following diffractive optic 40 further reshapes the reflected test wavefront 34 back into a planar wavefront through a second diffraction angle "$\nu$". For measuring nominally straight cylindrical surfaces, the two diffraction angles "$\mu$" and "$\nu$" are equal to each other and to the constant grazing angle "$\theta$".

Figure 3:
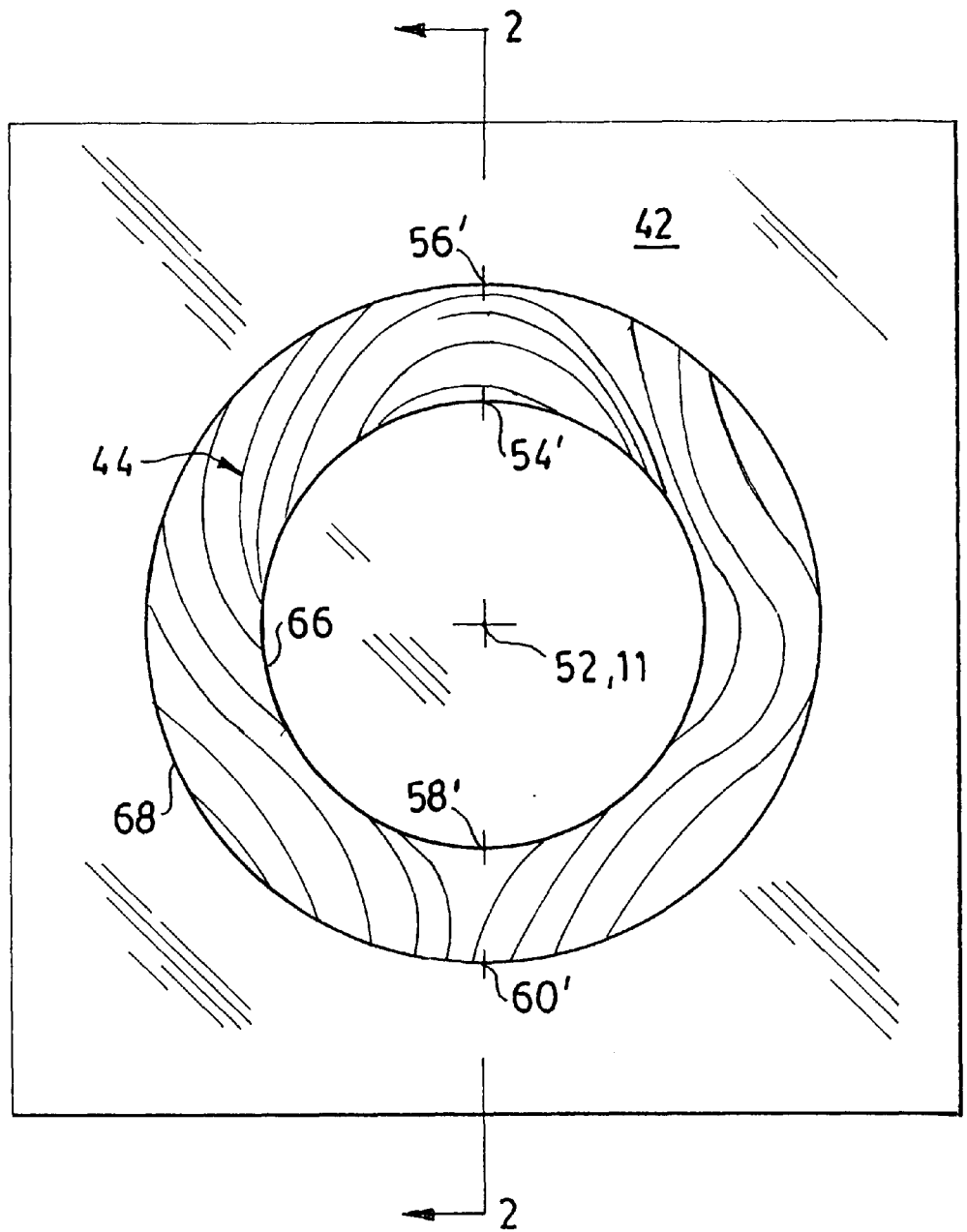
FIG. 3 is an axial view of an image-forming optic displaying an interference pattern representative of deviations in the test surface.

Thus, both the reference and test wavefronts 32 and 34 emerge from the following diffractive optic 40 as interfering planar wavefronts. With reference also to FIG. 3, an image-forming optic 42 images a pattern (referred to as an interferogram) 44 of the interference at the following diffractive optic 40 onto an image-recording device, such as a camera 46. The imaged interference pattern 44, which is superimposed on the test surface 14, represents deviations of the test surface 14 from a theoretical cylindrical surface.

The camera 46, which preferably incorporates a solid state or a charge-coupled device (CCD), records the interference pattern for processing by a computer 48. The image-forming optic can be incorporated into the camera 46 or can be provided as one or more separate elements. A display device 50, such as a cathode-ray tube, flat panel device, or printer, displays information about the cylindrical test surface 14 in a useful form. In addition to topographical information, derivable measures such as roundness, straightness, taper, and cylindricity could also be displayed. Alternatively, the information could be electronically stored or transmitted for use in another operation, such as feedback to a manufacturing operation.

FIG. 3 depicts the annular interference pattern 44 that appears at the following diffractive optic 40. A reference point 52 in the interference pattern 44 coincides with a point of intersection by the reference axis 11. Exemplary points of reflection 54, 56, 58, and 60 from the cylindrical test surface 14 correspond to points 54', 56', 58', and 60' in the interference pattern 44.

Angles about the reference axis 11 between the points of reflection 54, 56 and 58, 60 from the cylindrical test surface 14 correspond to similar angles between the points 54', 56' and 58', 60' about the reference point 52. However, axial distances along the reference axis 11 between the points of reflection 54, 58 and 56, 60 relate to radial distances between the points 54', 58' and 56', 60' from the reference point 52. For example, the points of reflection 54 and 58 at one end 62 of the cylindrical test surface 14 have corresponding points located at a shorter radial distance in the interference pattern 44 than the points of reflection 56 and 60 at the other end 64 of the cylindrical test surface 14.

Height deviations of the cylindrical test surface 14 from the theoretical test surface at the points of reflection 54, 56, 58, and 60 appear as phase differences at the corresponding points 54', 56', 58', and 60' in the interference pattern 44. Accurate measures of these phase differences are obtained by conventional phase shifting techniques in which optical path differences between the reference wavefront 32 and the test wavefront 34 are stepped through integer subdivisions of one wavelength. Intensity information at each phase step is stored and a complete phase map is calculated by established Fourier series methods. The stepping can be accomplished in a variety of ways such as by axially translating one of the diffractive optics 30 or 40, preferably the leading optic 30, or by changing the wavelength of the primary wavefront 28.

Sensitivity of the interferometer 10, which is a measure of the amount of deviation represented by adjacent fringes in the interference pattern 44, decreases with increasing grazing angles "θ". Accordingly, larger grazing angles "θ" within the range of specular reflection of the test surface 14 are preferred for improving accuracy of individually measured points.

However, grazing angles "θ" can also affect the size of the diffractive optics as well as the resolving power of the interferometer 10. The camera 46 is preferably arranged with an adjustable focus to equalize the resolution of points imaged along the innermost and outermost circumferences 66 and 68 of the interference pattern 44. Some limitation of the imaging angles seen by the camera 46 may be desirable to control differences between the resolution of points imaged along the innermost and outermost circumferences 66 and 68 of the interference pattern.

Figure 4:
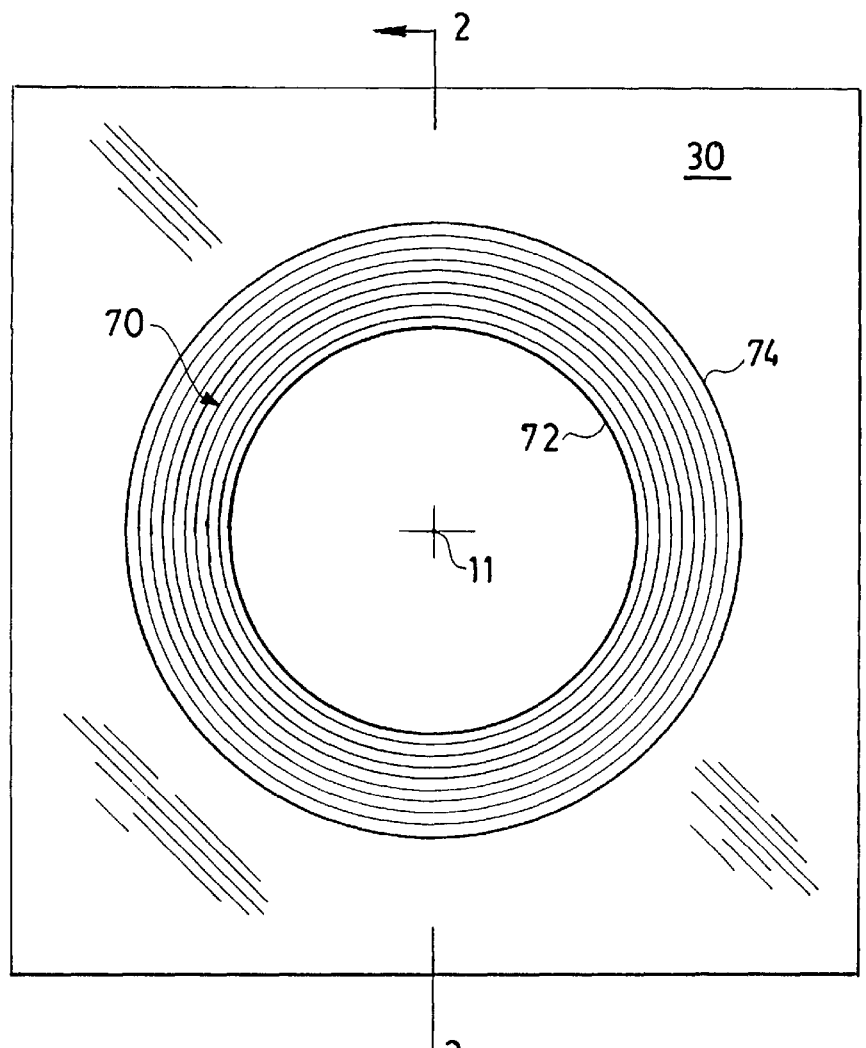
FIG. 4 is an axial view of one of the diffractive optics.
Figure 5:
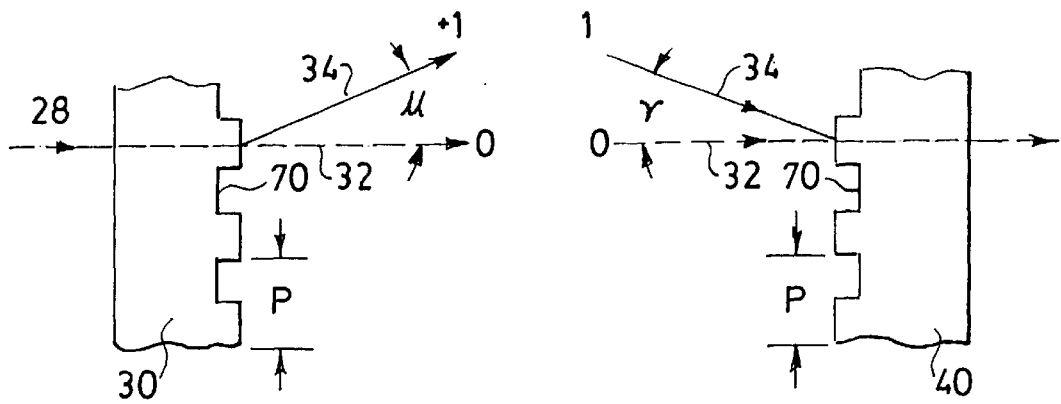
FIG. 5 is a fragmentary cross-sectional view of two diffractive optics.

The leading and following diffractive optics 30 and 40 are further illustrated by FIGS. 4 and 5. In FIG. 4, the leading diffractive optic 30 is shown as a diffraction grating having a diffracting pattern formed by a number of concentric closed-shaped grooves 70 for dividing light into two different diffraction orders. The following diffractive optic 40 is preferably a similar grating oriented as shown in the fragmentary cross-sectional view of FIG. 5. With the zero diffraction order aligned with the reference axis 11, positive or "+" diffraction orders refer to light rays that are diffracted toward the reference axis 11 and negative or "−" diffraction orders refer to light rays that are diffracted away from the reference axis 11.

The reference wavefront 32 is preferably transmitted (diffracted) by both diffractive optics 30 and 40 at a zero diffraction order, and the test wavefront 34 is preferably transmitted (diffracted) by both optics 30 and 40 at a first diffraction order. However, the leading diffractive optic 30 is oriented for dividing the reference and test wavefronts 32 and 34, and the following diffractive optic 40 is oriented for combining the two wavefronts 32 and 34.

The grooves 70 in both gratings are spaced at a constant pitch "ρ" for uniformly inclining the test beam 34 with respect to the reference beam 32 through the diffraction angles "μ" and "ν". Sensitivity, as a measure of units per fringe, is equal to one-half of the pitch "ρ" for first order diffractions of the test wavefront. Although varying in scale, the grooves 70 have paths that are shaped to match transverse sections of the cylindrical test surface 14. For example, inner groove 72 matches the circular section at the far end 64 of the test surface 14, and outer groove 74 matches the circular section at the near end 62 of the test surface 14. Together, the shape and spacing of the grooves 70 represent a mathematical description of the test surface 14.

Profiles of the grooves 70 can be shaped to control diffraction energies in the zero, first, and higher diffraction orders. For example, the grooves 70 can be blazed to concentrate diffraction energies within only two diffraction orders, which are used for diffracting the reference and test wavefronts 32 and 34. The depth or width of the grooves 70 can also be varied to appropriately divide the diffraction energies between the interfering reference and test wavefronts 32 and 34 to maximize contrast of the interference pattern 44. Accounting also for the reflectivity of the test surface 14, either or both of the diffractive optics 30 or 40 can be modified to accomplish this.

The diffractive optics 30 and 40 can be made to high accuracy by photolithographically exposing and etching coatings under computer control. This method of manufacture enables complex mathematical descriptions of test surfaces to be readily embedded into the diffractive optics. Alternatively, the diffractive optics 30 and 40 can be made by etching glass substrates for improving durability or by modifying the underlying substrate to exhibit similar modulations in amplitude or phase.

Figure 6:
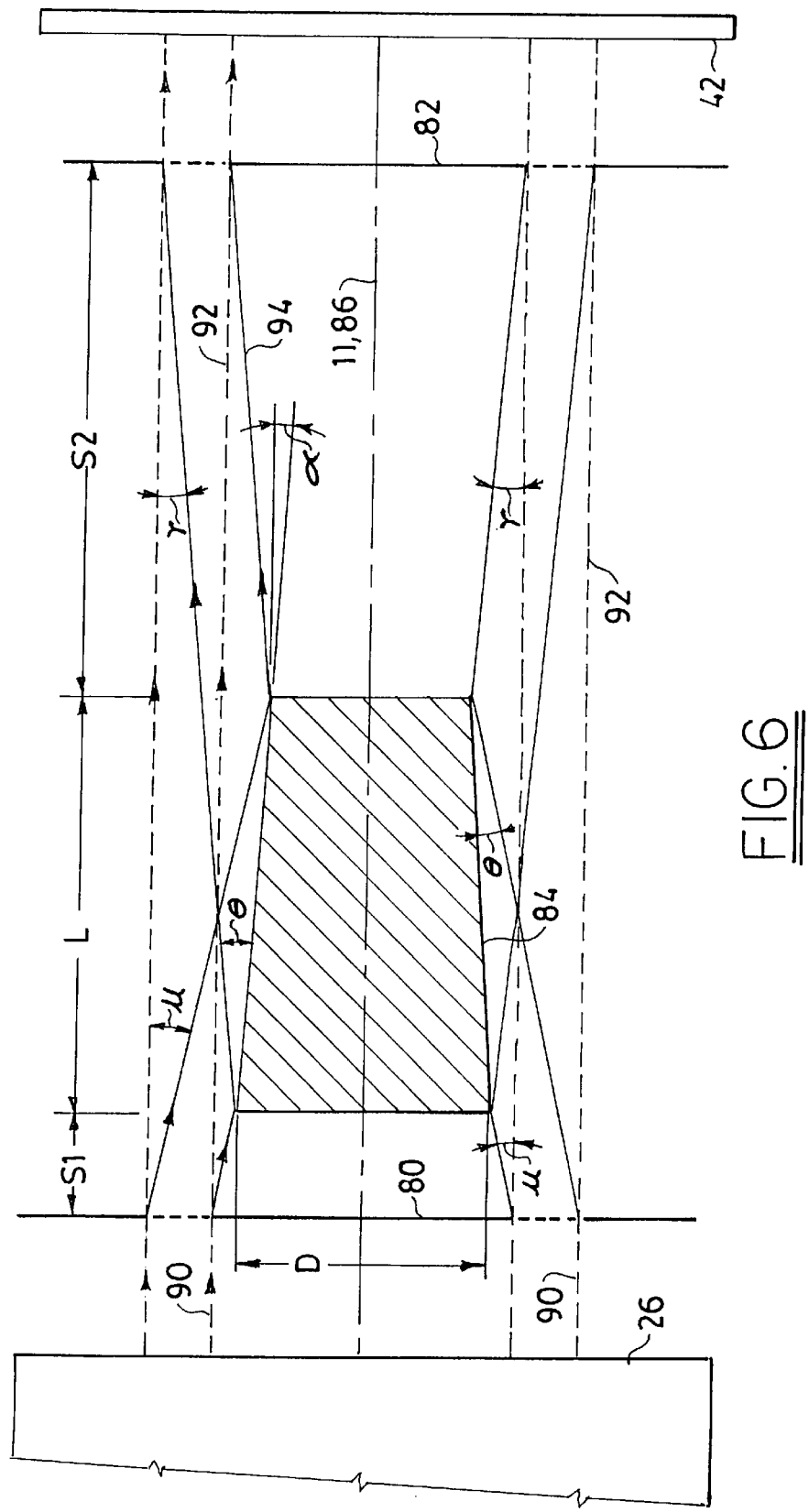
FIG. 6 is a diagram of diffractive optics used in the interferometer for measuring external conical test surfaces.

FIG. 6 shows an alternative arrangement of the diffractive optics for measuring tapered test surfaces. Leading and following diffractive optics 80 and 82 measure an external conical test surface 84 having a taper angle "α" with respect to an axis of symmetry 86.

A planar primary wavefront 90 is split by the leading diffractive optic 80 into a planar reference wavefront 92 and an axiconic test wavefront 94 composed of rays inclined to the reference axis 11 through the first diffraction angle "μ". The test wavefront 94 is reflected by the conical test surface 84 at a constant grazing angle "θ". The following diffractive optic 82 rediffracts the reflected test wavefront 94 through the second diffraction angle "ν" into a planar shape aligned with the reference wavefront 92. The two diffraction angles "μ" and "ν" are related to the taper angle "α" and the grazing angle "θ" as follows:

$$\mu - \nu = 2\alpha$$

$$\mu + \nu = 2\theta$$

Preferably, the leading and following diffractive optics 80 and 82 are located along the reference axis 11 in relative positions required to size the two optics 80 and 82 equally. These relative positions are defined by the following equation:

$$(S2+L)\tan\nu = (S1+L)\tan\mu - L\tan\alpha$$

where "S1" is an axial distance between the first diffractive optic 80 and the test surface 84, "S2" is an axial distance between the test surface 84 and the second diffractive optic 82, and "L" is the axial length of the test surface 84. Different relative positions can be used to satisfy other optical or mechanical considerations when the test surface is defined by a surface of revolution. For example, the following diffractive optic of FIG. 2 could be positioned beyond a cross-over point of a converging test wavefront to provide better access to the test piece.

An inner diameter "ID" and an outer diameter "OD" of the equally sized diffractive optics 80 and 82 are related to the diameter "D" of the conical test surface 84 as follows:

$$ID = D + 2\,S1\tan\mu$$

$$OD = D + 2(L+S2)\tan\nu$$

My invention can also be used to measure other and more complex three-dimensional test surfaces, including inside and outside surfaces of non-circular cylinders and cones, involute profiles, and gear teeth. The nonlinear paths of the diffractive optics can be varied to match non-circular transverse sections of test surfaces, and the pitch spacing of the grooves can be varied to match curvatures in axial sections of test surfaces. The diffractive optics can also be stepped or curved to further shape the wavefronts or to provide focusing qualities. Limited sections of the gratings can be used to measure surfaces that lack an axis of symmetry. Where possible, sensitivity of the interferometer along the reference axis is preferably held constant but can be varied by changing the pitch of the grating grooves.

I claim:

1. An interferometer for measuring variations in a three-dimensional test surface at grazing incidence comprising:

a light source that produces a primary wavefront having a planar shape;

a leading diffractive optic that (a) divides the primary wavefront into a reference wavefront and a test wavefront and (b) reshapes the test wavefront into a non-planar shape different than the reference wavefront for reflecting from the three-dimensional test surface at a grazing angle;

a following diffractive optic that (a) recombines the reference and test wavefronts and (b) further reshapes the test wavefront into a planar shape in common with the reference wavefront for producing a pattern of interference between the further reshaped test wavefront and the reference wavefront indicative of variations in the test surface; and an image-forming optic that images the interference pattern between the further reshaped test wavefront and the reference wavefront sharing a common planar shape onto an image-recording device.

2. The interferometer of claim 1 in which said leading and following diffractive optics and said image-forming optic are aligned to a common reference axis.

3. The interferometer of claim 2 in which the test wavefront converges through a focus along said common reference axis.

4. The interferometer of claim 2 in which and said test wavefront reshaped by said leading diffractive optic varies in angular orientation around said common reference axis.

5. The interferometer of claim 1 in which said leading and following diffractive optics are leading and following diffraction gratings each having unequally spaced grooves for relatively reshaping the test wavefront.

6. The interferometer of claim 1 in which at least one of said leading and following diffractive optics is arranged for balancing diffraction energies of the recombined reference and test wavefronts.

7. The interferometer of claim 1 in which the test and reference wavefronts are divided by the different diffraction orders of said leading diffractive optic through a leading diffraction angle "$\mu$", and the test and reference wavefronts are recombined by the different diffraction orders of said following diffractive optic through a following diffraction angle "$\nu$" that is different from said leading diffraction angle "$\mu$".

8. The interferometer of claim 7 in which said leading and following diffraction angles "$\mu$" and "$\nu$" are related to the grazing angle now designated "$\theta$" at which the test wavefront is reflected from the test surface in accordance with the following relationship:

$$\mu = \nu + 2\theta$$

9. The interferometer of claim 8 in which said leading and following diffractive optics are aligned with a common reference axis and said leading and following diffraction angles "$\mu$" and "$\nu$" are related to an angle "$\alpha$" at which the test surface is inclined to the reference axis in accordance with the following relationship:

$$\mu - \nu = 2\alpha$$

10. A method of optically measuring a three-dimensional test surface at a grazing angle comprising the steps of:

positioning the test surface along an optical path between leading and following diffractive optics;

shaping a beam of light into a primary wavefront having a planar shape;

dividing the primary wavefront into a test wavefront and a reference wavefront;

diffracting the test wavefront with the leading diffractive optic into a non-planar shape different from the reference wavefront;

reflecting the diffracted test wavefront from the test surface at grazing incidence;

further diffracting the test wavefront with the following diffractive optic into a planar shape in common with the reference wavefront;

combining the further diffracted test wavefront with the reference wavefront;

producing an interference pattern between the combined test and reference wavefronts indicative of variations in the test surface; and imaging the interference pattern produced between the combined test and reference wavefronts sharing a common planar shape onto an image-recording device.

11. The method of claim 10 in which said leading and following diffractive optics and said image-forming optic are aligned with a common reference axis corresponding to a reference point in the interference pattern.

12. The method of claim 11 in which axial distances along the reference axis at points of reflection of the test wavefront from the test surface relate to radial distances from the reference point in the interference pattern.

13. The method of claim 12 in which angles about the reference axis at the points of reflection from the test surface relate to angles about the reference point in the interference pattern.

14. The method of claim 13 in which variations in height normal to the test surface at the points of reflection from the test surface correspond to phase differences between the test and reference wavefronts in the interference pattern.

15. The method of claim 11 including the further step of converging the test wavefront through a focus along the common reference axis.

16. The method of claim 11 including the further step of moving one of the diffractive optics along the common reference axis for shifting phase between the test and reference wavefronts.

17. The method of claim 10 in which the leading diffractive optic also divides the primary wavefront into a test wavefront and a reference wavefront and at least one of said diffractive optics is arranged for balancing diffraction energies of the recombined reference and test wavefronts.

18. The method of claim 10 in which the leading and following diffractive optics have different diffracting patterns with nonlinear paths.

19. The method of claim 18 in which the test wavefront reshaped by the leading diffractive optic varies in angular orientation around an axis of propagation.

* * * * *